(12) United States Patent
Kim

(10) Patent No.: US 11,620,529 B2
(45) Date of Patent: Apr. 4, 2023

(54) METHOD OF CONTINUAL-LEARNING OF DATA SETS AND APPARATUS THEREOF

(71) Applicant: Lunit Inc., Seoul (KR)

(72) Inventor: Hyo-Eun Kim, Seoul (KR)

(73) Assignee: LUNIT INC., Seoul (KR)

( * ) Notice: Subject to any disclaimer, the term of this patent is extended or adjusted under 35 U.S.C. 154(b) by 622 days.

(21) Appl. No.: 16/706,570

(22) Filed: Dec. 6, 2019

(65) Prior Publication Data
US 2020/0372362 A1 Nov. 26, 2020

(30) Foreign Application Priority Data
May 20, 2019 (KR) .................. 10-2019-0058905

(51) Int. Cl.
*G06N 3/08* (2006.01)
*G06N 3/04* (2006.01)
*G06N 3/084* (2023.01)

(52) U.S. Cl.
CPC .............. *G06N 3/084* (2013.01); *G06N 3/04* (2013.01)

(58) Field of Classification Search
CPC ........ G06N 3/084; G06N 3/04; G06N 3/0445; G06N 3/0454; G06N 20/20; G06N 3/08
See application file for complete search history.

(56) References Cited

U.S. PATENT DOCUMENTS

| 11,210,559 B1 * | 12/2021 | Kolouri ............... G06V 10/776 |
| 2020/0074305 A1 * | 3/2020 | Cao ........................ G06N 3/084 |
| 2021/0125074 A1 * | 4/2021 | Lee ........................ G06V 10/82 |
| 2022/0012583 A1 * | 1/2022 | Tian ..................... G06N 3/0454 |

FOREIGN PATENT DOCUMENTS

| EP | 3582142 A1 * | 12/2019 | .......... G06K 9/4628 |
| WO | WO-2019238976 A1 * | 12/2019 | .......... G06K 9/4628 |
| WO | WO-2022053474 A1 * | 3/2022 | |

OTHER PUBLICATIONS

Bernard Ans & Stephane Rousset (2000) Neural networks with a self-refreshing memory: Knowledge transfer in sequential learning tasks without catastrophic forgetting, Connection Science, 12:1, 1-19, DOI: 10.1080/095400900116177 (Year: 2000).*

(Continued)

*Primary Examiner* — Charles T Shedrick
(74) *Attorney, Agent, or Firm* — Lex IP Meister, PLLC

(57) ABSTRACT

This disclosure relates to a method of sequential machine learning of data sets and an apparatus thereof. The method may include generating a first machine learning model by generating a first feature space based on a first data set, generating first predictive label information based on the first feature space, performing machine learning on a relationship between the first data set and first label information related to a first data set, and performing machine learning on a relationship between the first predictive label information and the first feature space. The method may also include generating a second machine learning model based on the first machine learning model by generating a second feature space based on a second data set, generating second predictive label information based on the second feature space, and performing machine learning on a relationship between the second data set and a second label information.

17 Claims, 9 Drawing Sheets

(56) References Cited

OTHER PUBLICATIONS

McCloskey et al., "Catastrophic Interference in Connectionist Networks: The Sequential Learning Problem", Psychology of Learning and Motivation, vol. 24 (1989).
Girshick et al., "Rich feature hierarchies for accurate object detection and semantic segmentation", In: CVPR—21 pages (2014).
Kirkpatrick et al., "Overcoming catastrophic forgetting in neural networks", In: PNAS, vol. 114, No. 13—6 pages (Mar. 28, 2017).
Li et al., "Learning without Forgetting", In: ECCV—13 pages (2017).
Vincent et al., "Stacked Denoising Autoencoders: Learning Useful Representations in a Deep Network with a Local Denoising Criterion", Journal of Machine Learning Research 11—38 pages (Dec. 2010).
Hwang et al., "A novel approach for tuberculosis screening based on deep convolutional neural networks", In: SPIE, vol. 9785 (Mar. 24, 2016).
Hyo-Eun Kim et al., "Keep and Learn: Continual Learning by Constraining the Latent Space for Knowledge Preservation in Neural Networks", presentation at MICCAI 2018 (May 28, 2018).

* cited by examiner

|  | CIFAR-10 ||||  CIFAR-100 ||||
| --- | --- | --- | --- | --- | --- | --- | --- | --- |
|  | stage-1 | stage-2 | stage-3 | stage-4 | stage-1 | stage-2 | stage-3 | stage-4 |
| FT | 20.21(.151) | 16.76(.410) | 15.40(.174) | 15.02(.174) | 50.13(1.25) | 42.79(.692) | 40.53(.407) | 38.96(.354) |
| EWC | 19.87(.421) | 16.70(.178) | 15.42(.258) | 14.77(.331) | 49.93(.937) | 42.52(.299) | 40.72(.231) | 38.94(.504) |
| LwF | 20.28(.592) | 16.62(.453) | 15.46(.220) | 14.68(.304) | 50.41(.422) | 42.70(.334) | 39.50(.417) | 37.51(.319) |
| LwF+ | 19.88(.574) | 16.57(.194) | 15.02(.238) | 14.05(.113) | 50.69(.760) | 42.64(.887) | 39.31(.490) | 37.30(.558) |
| EWCLwF | 19.79(.122) | 16.62(.041) | 15.45(.413) | 14.49(.183) | 50.15(.552) | 42.22(.481) | 39.02(.338) | 37.44(.526) |
| EWCLwF+ | 20.26(.474) | 16.99(.410) | 15.34(.440) | 14.25(.239) | 50.10(.439) | 42.49(.335) | 39.32(.288) | 37.21(.377) |
| Proposed | 20.11(.431) | 16.12(.253) | 14.54(.175) | 13.74(.195) | 49.87(.461) | 42.00(.479) | 38.81(.438) | 36.42(.373) |

FIG. 13

METHOD OF CONTINUAL-LEARNING OF DATA SETS AND APPARATUS THEREOF

CROSS-REFERENCE TO RELATED PATENT APPLICATION

This application claims the benefit of Korean Patent Application No. 10-2019-0058905, filed on May 20, 2019, in the Korean Intellectual Property Office, the disclosure of which is incorporated herein in its entirety by reference.

BACKGROUND

1. Technical Field

This disclosure generally relates to a method of sequential machine learning of data sets and an apparatus thereof. More specifically, this disclosure generally relates to a method of sequentially machine learning multiple data sets to update a machine learning model, and an apparatus thereof.

2. Discussion of Related Technology

To acquire the best machine learning model, it is necessary to perform machine learning by entering as much data as possible. However, it can be difficult to take data out of data centers. Such environment is known as restrict multi-center learning environment. In the restricted multi-center learning environment, data of all data centers cannot be utilized at once. Accordingly, data sets of each center must be used sequentially for progressive learning of a machine learning model. For instance, first machine learning model can be acquired based on first data set from first data center (first stage) and second machine learning model can be acquired based on second data set from second data center (second stage) and the first machine learning model.

However, there are cases in which data sets used for machine learning at a previous data center cannot be used for machine learning at the current data center. As the current data center performs machine learning of current data set, the model learned at the previous data center is forgotten slowly. This phenomenon is known as catastrophic forgetting. In particular, this problem is known to be more serious in a neural network that performs optimization using gradient descent algorithm.

Catastrophic forgetting is one of important research topics in machine learning, and various methods have been proposed to resolve catastrophic forgetting.

First off, fine-tuning method introduced in the paper of "Girshick, R., Donahue, J., et al., Rich feature hierarchies for accurate object detection and semantic segmentation, In: CVPR (2014)" is a method of defining model parameters learned in previous stage as initial point and tuning model parameters based on data set of current stage. This method had a difficulty in resolving catastrophic forgetting because parameters included in the machine learning model can be changed drastically between stages.

Next, Elastic Weight Consolidation (EWC) introduced in the paper of "Kirkpatrick, J., Pascanu, R., et al., Overcoming catastrophic forgetting in neural networks, In: PNAS (2017)" defines the importance of model parameters learned in the previous stage. Importance of model parameters is known as the Fisher information matrix. EWC utilizes importance of model parameters as the per-parameter weight decay constant. In other words, this is a technique that regularizes important model parameters from perspective of previous stage model so they are not changed much while learning in the next stage. EWC had a difficulty in determining importance of model parameters perfectly.

Third method is Learning without Forgetting (LwF) method introduced in the paper of "Li, Z. and Hoiem, D., Learning without forgetting, In: ECCV (2016)." The LwF method pre-calculates feed forward logit of model parameters learned in previous stage as LwF-logit for all data sets of current stage before initiating learning in each stage. In addition, the LwF method utilizes both label and LwF-logit of new data sets for learning of current stage. Here, the label is used for the purpose of learning new data sets, and the LwF-logit is used to preserve models created by previous data sets. The LwF method is intended for multi-task, multi-center learning, and the LwF+ method is a variation of the LwF method for single-task, multi-center learning. Since there is no limit to changes in feature space, the LwF method had a difficulty preventing drastic changes in feature space caused by new data sets.

SUMMARY

According to an aspect of the present invention, a method of sequential machine learning of data sets according to this disclosure comprises generating first feature space based on first data set, generating first predictive label information based on the first feature space, generating first predictive feature space based on the first predictive label information, and generating first machine learning model by performing machine learning on relationship between the first data set and first label information related to the first data set and on relationship between the first predictive label information and first feature space.

The method of sequential machine learning of data sets according to this disclosure comprises generating second feature space based on second data set, generating second predictive label information based on second feature space, generating second predictive feature space based on second predictive label information, and generating second machine learning model by performing machine learning on relationship between the second data set and second label information related to the second data set and on relationship between the second predictive label information and second feature space.

In the method of sequential machine learning of data sets according to this disclosure, generating the first feature space comprises generating first feature space based on the first data set and first feature extraction parameter related to neural network, generating the first predictive label information comprises generating the first predictive label information by applying first parameter to the first feature space, and generating the first predictive feature space comprises generating the first predictive feature space by applying second parameter to the first predictive label information.

In the method of sequential machine learning of data sets according to this disclosure, generating the first machine learning model comprises acquiring the first feature extraction parameter, modified first parameter, and modified second parameter to minimize at least one of difference between the first label information and first predictive label information and difference between the first feature space and first predictive feature space using back propagation.

In the method of sequential machine learning of data sets according to this disclosure, generating the second feature space comprises generating the second feature space based on the second data set and modified first feature extraction parameter, generating the second predictive label information comprises generating the second predictive label information by applying the first parameter to the second feature space, and generating the second predictive feature space comprises generating the second predictive feature space by applying the second parameter to the second predictive label information.

In the method of sequential machine learning of data sets according to this disclosure, generating the second machine learning model comprises generating the third predictive label information by applying the third parameter to the second feature space and acquiring the second feature extraction parameter by modifying the first modified feature extraction parameter and modified third parameter by modifying the third parameter to minimize at least one of difference between the second feature space and second predictive feature space, difference between the third label information and second predictive label information, and difference between the second label information and third predictive label information using back propagation.

The method of sequential machine learning of data sets according to this disclosure further comprises acquiring the third label information by applying the first machine learning model to the second data set, wherein the modified first parameter and modified second parameter remain unchanged.

The method of sequential machine learning of data sets according to this disclosure comprises receiving image data, acquiring fourth label by applying the image data to the second machine learning model that includes the second feature extraction parameter and modified third parameter, and storing the fourth label on a memory.

The machine learning apparatus that performs continual learning using machine learning according to this disclosure includes a processor and memory. The processor uses instructions stored on the memory to execute generating first feature space based on first data set, generating first predictive label information based on the first feature space, generating first predictive feature space based on the first predictive label information, and generating first machine learning model by performing machine learning on relationship between the first data set and first label information related to the first data set and on relationship between the first predictive label information and first feature space.

The processor of the machine learning apparatus that performs continual learning using machine learning according to this disclosure uses instructions stored on the memory to execute generating second feature space based on second data set, generating second predictive label information based on second feature space, generating second predictive feature space based on second predictive label information, and generating second machine learning model by performing machine learning on relationship between the second data set and second label information and on relationship between the second predictive label information and second feature space.

The processor of the machine learning apparatus that performs continual learning using machine learning according to this disclosure uses instructions stored on the memory to execute generating first feature space based on first data set and first feature extraction parameter related to neural network, generating first predictive label information by applying first parameter to the first feature space, and generating first predictive feature space by applying second parameter to the first predictive label information.

The processor of the machine learning apparatus that performs continual learning using machine learning according to this disclosure uses instructions stored on the memory to execute acquiring first feature extraction parameter, modified first parameter, and modified second parameter, which minimize at least one of difference between first label information and first predictive label information and difference between first feature space and first predictive feature space, using back propagation.

The processor of the machine learning apparatus that performs continual learning using machine learning according to this disclosure uses instructions stored on the memory to execute generating second feature space based on second data set and first feature extraction parameter, generating second predictive label information by applying first parameter to the second feature space, generating second predictive feature space by applying second parameter to the first predictive label information, and generating third predictive label information by applying third parameter to the second feature space.

The processor of the machine learning apparatus that performs continual learning using machine learning according to this disclosure executes acquiring second feature extraction parameter by modifying modified first feature extraction parameter and modified third parameter by modifying third parameter, which minimize at least one of difference between second feature space and second predictive feature space, difference between third label information and second predictive label information, and difference between second label information and third predictive label information, using back propagation.

The processor of the machine learning apparatus that performs continual learning using machine learning according to this disclosure uses instructions stored on the memory to additionally execute acquiring third label information by applying first machine learning model to second data set, wherein modified first parameter and modified second parameter remain unchanged.

The processor of the machine learning apparatus that performs continual learning using machine learning according to this disclosure uses instructions stored on the memory to execute receiving image data, acquiring fourth label by applying the image data to second machine learning model that includes second feature extraction parameter and modified third parameter, and storing the fourth label on the memory.

The method of sequential machine learning of data sets according to this disclosure comprises generating machine learning model by performing machine learning on relationship between input data set and label information, generating predictive label information by applying the machine learning model to the input data set, and restoring feature space of the machine learning model from the predictive label information.

In the method of sequential machine learning of data sets according to this disclosure, restoring feature space of the machine learning model comprises restoring the feature space from the predictive label information based on sub machine learning model that performed machine learning on relationship between the predictive label information and feature space, wherein the feature space is a hidden layer of the machine learning model.

The machine learning apparatus that performs continual learning using machine learning according to this disclosure comprises a processor and memory. The processor uses instructions stored on the memory to execute generating machine learning model by performing machine learning on relationship between input data set and label information, generating predictive label information by applying the machine learning model to the input data set, and restoring feature space of the machine learning model from the predictive label information.

The processor of the machine learning apparatus that performs continual learning using machine learning according to this disclosure uses instructions stored on the memory to execute restoring the feature space from the predictive label information using sub machine learning model that performed machine learning on relationship between the predictive label information and feature space, wherein the feature space is a hidden layer of the machine learning model.

In addition, a program used to embody operation method of the machine learning apparatus described can be recorded on a computer readable recording medium.

BRIEF DESCRIPTION OF THE DRAWINGS

These and/or other aspects will become apparent and more readily appreciated from the following description of embodiments, taken in conjunction with the accompanying drawings.

FIG. 13 is a table that presents performance of a machine learning method according to an embodiment of this disclosure.

DETAILED DESCRIPTION

Figure 1:
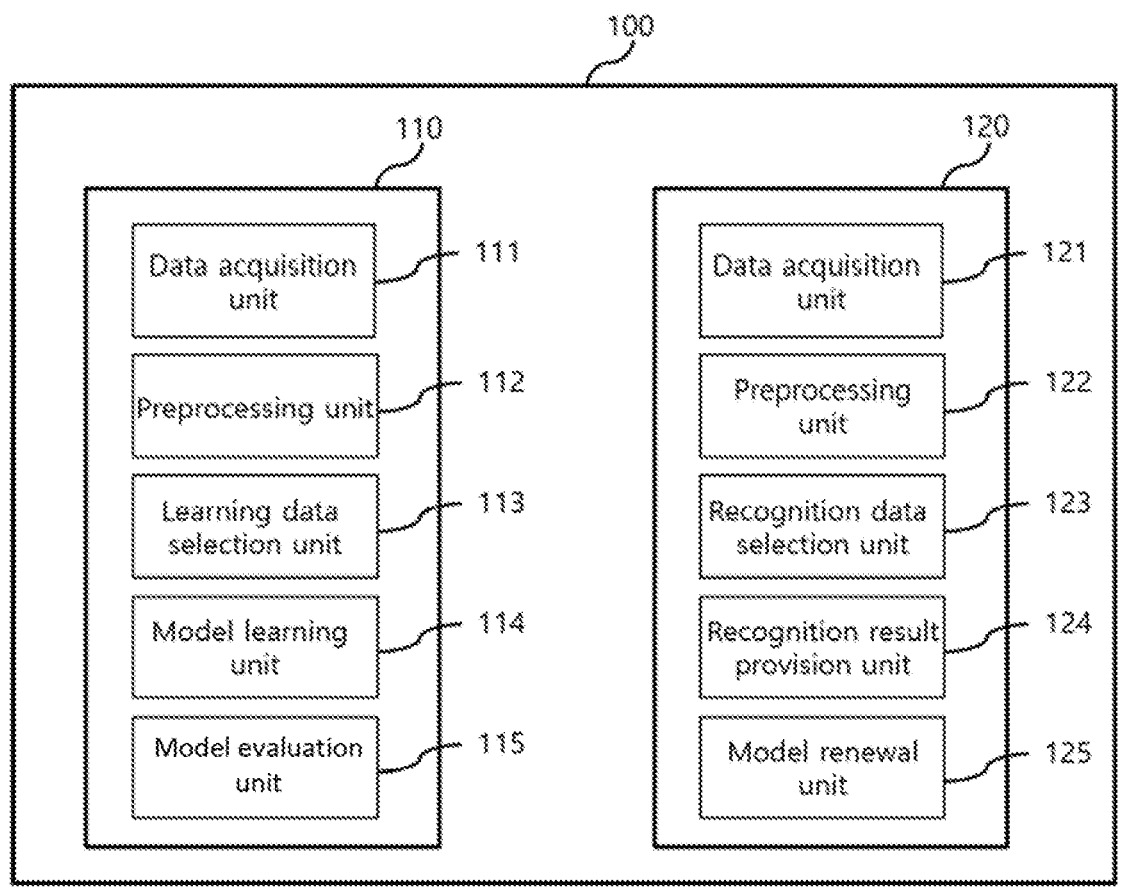
FIG. 1 is a block diagram of a machine learning apparatus according to an embodiment of this disclosure.

Merits and characteristics of embodiments disclosed, as well as the method of accomplishing them, can be clarified by referring to the attached drawings and embodiments described below. However, this disclosure is not limited to the embodiments disclosed hereafter but can be embodied into different forms. These embodiments are simply provided to make this disclosure complete and to completely inform the scope of this invention to persons who have common knowledge in the technical field of this disclosure.

The terms used in this specification will be explained briefly, and embodiments of the present disclosure will be explained in detail.

Terms used in this specification are ordinary terms that are used widely, selected by accounting for functions of this disclosure. These terms can change according to the intention of engineers who work in the related fields, precedents, appearance of new technologies, etc. In addition, certain terms were selected arbitrarily by the applicant, for which case the meanings of such terms will be explained in detail in the description of the invention. Therefore, the terms used in this disclosure must be defined based on their definitions and overall application in this disclosure instead of their names.

Unless clearly specified to be singular, singular expressions used in this specification shall also include plurality. In addition, unless clearly specified to be plural, plural expressions shall include singularity.

When a part of this specification is said to "comprise" a component, this does not exclude other components and means that other components can also be included unless specifically described otherwise.

In addition, term "unit" used in this specification refers to a software or hardware component. A "unit" plays certain roles, but it is not limited to software or hardware. A "unit" can exist in an addressable storage medium or play one or more processors. Therefore, for instance, "units" include components such as software components, object-oriented software components, class components and task components, processes, functions, attributes, procedures, subroutines, program code segments, drivers, firmware, microcode, circuit, data, database, data structures, tables, arrays, and variables. Functions provided within components and "units" can be combined into smaller number of components and "units" or subdivided into additional components and "units."

According to an embodiment of this disclosure, "units" can be embodied using processor and memory. Term "processor" is interpreted broadly to include general-purpose processor, Central Processing Unit (CPU), microprocessor, Digital Signal Processor (DSP), controller, microcontroller, state machine, etc. In some environments, "processor" may refer to Application Specific Integrated Circuit (ASIC), Programmable Logic Device (PLD), Field Programmable Gate Array (FPGA), etc. The term "processor" may, for instance, also refer to combination of DSP and microprocessor, combination of multiple microprocessors, combination of one or more microprocessors combined with a DSP core, or combination of processing devices that is same as other combinations of such configuration.

Term "memory" is interpreted broadly to include a random electronic component that can save electronic information. The term memory may also refer to various types of processor-readable medium such as Random-Access Memory (RAM), Read-Only Memory (ROM), Non-Volatile Random-Access Memory (NVRAM), Programmable Read-Only Memory (PROM), Erasable Programmable Read-Only Memory (EPROM), Electrically Erasable PROM (EEPROM), flash memory, magnetic or optical data storage device, registers, etc. Whereas a processor can read information from a memory and record information on a memory, a memory is called to be in electronic communication with a processor. A memory integrated with a processor is in electronic communication with the processor.

Embodiments are explained in detail below by referring to the attached figure so that this disclosure can be easily implemented by persons with common knowledge in the technical field of this disclosure. To clarify explanation of this disclosure in the figures, parts irrelevant to the explanation are omitted.

FIG. 1 is a block diagram of a machine learning apparatus (100) according to an embodiment of this disclosure.

Referring to FIG. 1, the machine learning apparatus (100) according to an embodiment can comprise at least one of data learning unit (110) and data recognition unit (120). The machine learning apparatus (100) can include a processor and memory.

The data learning unit (110) can learn machine learning model using data set to perform target task. The data learning unit (110) can receive label information related to data set and target task. The data learning unit (110) can acquire machine learning model by performing machine learning on relationship between data set and label information. Machine learning model acquired by the data learning unit (110) can be a model to generate label information using data set.

The data recognition unit (120) can receive and save machine learning model of the data learning unit (110). The data recognition unit (120) can output label information by applying input data to machine learning model. In addition, the data recognition unit (120) can be used to renew machine learning model using input data, label information, and output from machine learning model.

At least one of the data learning unit (110) and data recognition unit (120) can be made into at least one hardware chip and mounted on an electronic apparatus. For instance, at least one of the data learning unit (110) and data recognition unit (120) can be made into an exclusive hardware chip for artificial intelligence (AI) or as a part of an existing general-purpose processor (e.g. CPU or application processor) or graphic-only processor (e.g. GPU) to be mounted on various electronic apparatus explained earlier.

In addition, the data learning unit (110) and data recognition unit (120) can be mounted separately on different electronic apparatus. For instance, one of the data learning unit (110) and data recognition unit (120) can be included in the electronic apparatus with the other one included in a server. In addition, the data learning unit (110) and data recognition unit (120) can be connected with or without wire to provide machine learning model constructed by the data learning unit (110) to data recognition unit (120) or provide input data of the data recognition unit (120) to data learning unit (110) as additional learning data.

On the one hand, at least one of the data learning unit (110) and data recognition unit (120) can be embodied into a software module. If at least one of the data learning unit (110) and data recognition unit (120) is embodied into a software module (or a program module that includes instructions), the software module can be stored on the memory or non-transitory computer readable media. In addition, in this case, at least one software module can be provided by an Operating System (OS) or by a prescribed application. Otherwise, at least one software module can have a portion provided by an Operating System (OS) and the other portion provided by a prescribed application.

The data learning unit (110) according to an embodiment of this disclosure can comprise a data acquisition unit (111), preprocessing unit (112), learning data selection unit (113), model learning unit (114), and model evaluation unit (115).

The data acquisition unit (111) can acquire data necessary for machine learning. Since large volume of data is needed for learning, the data acquisition unit (111) can receive data sets that include multiple data.

Label information can be assigned to each of multiple data. The label information may be information that explains each of multiple data. The label information may be information to be derived by target task. The label information can be acquired from user input, memory, or result of machine learning model. For instance, if the target task is to determine existence of a certain object in an image, multiple data would be multiple image data and label information would be whether certain object exists in each of the multiple images.

The preprocessing unit (112) can preprocess acquired data so that data received can be used for machine learning. The preprocessing unit (112) can process acquired data sets into preset format to be used by the model learning unit (114) described later.

The learning data selection unit (113) can select data necessary for learning among preprocessed data. Selected data can be provided to the model learning unit (114). The learning data selection unit (113) can select data necessary for learning among preprocessed data according to preset standards. In addition, the learning data selection unit (113) can also select data according to preset standards through learning of the model learning unit (114) described later.

The model learning unit (114) can learn standards for label information output based on data set. In addition, the model learning unit (114) can perform machine learning by using data set and label information of data set as learning data. In addition, the model learning unit (114) can perform machine learning by additionally using acquired machine learning model. In this case, the acquired machine learning model can be a model constructed in advance. For instance, the machine learning model can be a model constructed in advance by receiving default learning data.

The machine learning model can be constructed by considering the application field of the learning model, purpose of learning, computer performance of the apparatus, etc. The machine learning model, for instance, can be a model based on neural network. For example, models like Deep Neural Network (DNN), Recurrent Neural Network (RNN), Long Short-Term Memory models (LSTM), BRDNN (Bidirectional Recurrent Deep Neural Network), and Convolutional Neural Networks (CNN) can be used as machine learning models, but the machine learning model is not limited to them.

According to various embodiments, if there are multiple machine learning models constructed in advance, the model learning unit (114) can decide a machine learning model that is highly associated with input learning data and default learning data as the machine learning model to be learned. In this case, default learning data can be already classified into data types, and the machine learning model can be constructed in advance for each data type. For instance, default learning data can be classified in advance according to various criteria including place where learning data are generated, time at which learning data are generated, size of learning data, learning data generator, object type of learning data, etc.

In addition, the model learning unit (114), for instance, can learn machine learning model using a learning algorithm that includes error back-propagation or gradient descent.

In addition, the model learning unit (114), for instance, can learn machine learning model through supervised learning that uses learning data as input values. In addition, the model learning unit (114), for instance, can acquire machine learning model through unsupervised learning that finds criteria for target task by learning data type needed for the target task on its own without supervision. In addition, the model learning unit (114), for instance, can learn machine learning model through reinforcement learning that uses feedback on correctness of result of the target task according to learning.

In addition, once machine learning model is learned, the model learning unit (114) can save the learned machine learning model. In this case, the model learning unit (114) can save the learned machine learning model on the memory of the electronic apparatus that includes the data recognition unit (120). Otherwise, the model learning unit (114) can also save the learned machine learning model on the memory of the server connected to the electronic apparatus connected via wired or wireless network.

The memory that saves the learned machine learning model, for instance, can also store instructions or data related to at least one other component of the electronic apparatus. In addition, the memory can save software and/or programs. Programs, for instance, may include kernel, middleware, Application Programming Interface (API) and/or application program (or "application"), etc.

The model evaluation unit (115) can enter evaluation data into the machine learning model and make the model learning unit (114) repeat learning if output results from evaluation data fail to satisfy prescribed criteria. In this case, evaluation data may be preset data to evaluate the machine learning model.

For instance, in the results of the machine learning model learned for evaluation data, the model evaluation unit (115) can be evaluated as to not satisfy the prescribed criteria if the number or ratio of evaluation data with inaccurate recognition result exceeds preset threshold value. For example, if the prescribed criteria are defined as ratio of 2% and the learned machine learning model outputs incorrect recognition result for 20 evaluation data out of 1,000 evaluation data, the model evaluation unit (115) can evaluate that the learned machine learning model is inappropriate.

On the one hand, if there are multiple learned machine learning models, the model evaluation unit (115) can evaluate whether each of the image learning model satisfies the prescribed criteria and decide the model that satisfies the prescribed criteria as the final machine learning model. In this case, if multiple models satisfy the prescribed criteria, the model evaluation unit (115) can decide one or prescribed number of models preset according to evaluation score as the final machine learning model.

On the one hand, at least one of the data acquisition unit (111), preprocessing unit (112), learning data selection unit (113), model learning unit (114), and model evaluation unit (115) in the data learning unit (110) can be made into at least one hardware chip and mounted on the electronic apparatus. For instance, at least one of the data acquisition unit (111), preprocessing unit (112), learning data selection unit (113), model learning unit (114), and model evaluation unit (115) can be made into an exclusive hardware chip for artificial intelligence (AI) or be made into a part of an existing general-purpose processor (e.g. CPU or application processor) or graphic-only processor (e.g. GPU) and mounted on various electronic apparatus described earlier.

In addition, the data acquisition unit (111), preprocessing unit (112), learning data selection unit (113), model learning unit (114), and model evaluation unit (115) may be mounted on an electronic apparatus or separately on different electronic apparatus. For instance, the data acquisition unit (111), preprocessing unit (112), learning data selection unit (113), model learning unit (114), and model evaluation unit (115) may have some of them included in the electronic apparatus and others in the server.

In addition, at least one of the data acquisition unit (111), preprocessing unit (112), learning data selection unit (113), model learning unit (114), and model evaluation unit (115) can be embodied into a software module. If at least one of the data acquisition unit (111), preprocessing unit (112), learning data selection unit (113), model learning unit (114), and model evaluation unit (115) is embodied into a software module (or a program module that includes instructions), the software module can be stored on non-transitory computer readable media. In addition, in this case, at least one software module can be provided by an Operating System (OS) or by a prescribed application. Otherwise, at least one software module can have a portion provided by an Operating System (OS) and the other portion provided by a prescribed application.

The data recognition unit (120) according to an embodiment of this disclosure may include a data acquisition unit (121), preprocessing unit (122), recognition data selection unit (123), recognition result provision unit (124), and model renewal unit (125).

The data acquisition unit (121) can receive input data. The preprocessing unit (122) can preprocess input data acquired so that input data acquired is used by the recognition data selection unit (123) or the recognition result provision unit (124).

The recognition data selection unit (123) can select necessary data among preprocessed data. Selected data can be provided to the recognition result provision unit (124). The recognition data selection unit (123) can select a part or all of preprocessed data according to the preset criteria. In addition, the recognition data selection unit (123) can also select data according to the preset criteria through learning by the model learning unit (114).

The recognition result provision unit (124) can acquire result data by applying selected data to the machine learning model. The machine learning model can be a machine learning model generated by the mode learning unit (114). The recognition result provision unit (124) can output result data.

The model renewal unit (125) can renew the machine learning model based on evaluation of recognition result provided by the recognition result provision unit (124). For instance, the model renewal unit (125) can make the model learning unit (114) renew the machine learning model by providing recognition result provided by the recognition result provision unit (124) to the model learning unit (114).

On the one hand, at least one of the data acquisition unit (121), preprocessing unit (122), recognition data selection unit (123), recognition result provision unit (124), and model renewal unit (125) in the data recognition unit (120) can be made into at least one hardware chip and mounted on the electronic apparatus. For instance, at least one of the data acquisition unit (121), preprocessing unit (122), recognition data selection unit (123), recognition result provision unit (124), and model renewal unit (125) can be made into an exclusive hardware chip for artificial intelligence (AI) or made into a part of an existing general-purpose processor (e.g. CPU or application processor) or graphic-only processor (e.g. GPU) and mounted on various electronic apparatus described earlier.

In addition, the data acquisition unit (121), preprocessing unit (122), recognition data selection unit (123), recognition result provision unit (124), and model renewal unit (125) can be mounted on one electronic apparatus or separately on different electronic apparatus. For instance, the data acquisition unit (121), preprocessing unit (122), recognition data selection unit (123), recognition result provision unit (124), and model renewal unit (125) can have some of them included in the electronic apparatus and others in the server.

In addition, at least one of the data acquisition unit (121), preprocessing unit (122), recognition data selection unit (123), recognition result provision unit (124), and model renewal unit (125) can be embodied into a software module. If at least one of the data acquisition unit (121), preprocessing unit (122), recognition data selection unit (123), recognition result provision unit (124), and model renewal unit (125) is embodied into a software module (or a program module that includes instructions), the software module can be stored on non-transitory computer readable media. In addition, in this case, at least one software module can be provided by an Operating System (OS) or by a prescribed application. Otherwise, at least one software module can have a portion provided by an Operating System (OS) and the other portion provided by a prescribed application.

The method of sequential machine learning of data sets by the data learning unit (110) and the apparatus thereof are explained in greater detail below.

Figure 2:
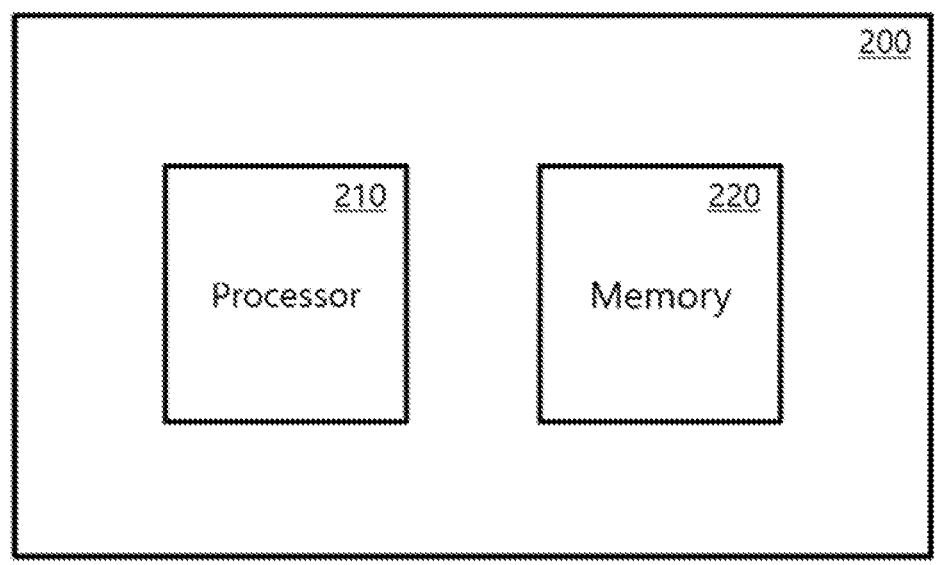
FIG. 2 is a figure that represents a machine learning apparatus according to an embodiment of this disclosure.

FIG. 2 is a figure that represents a machine learning apparatus according to an embodiment of this disclosure.

The machine learning apparatus (200) can include a processor (210) and memory (220). The processor (210) can execute instructions stored on the memory (220).

As described above, the machine learning apparatus (200) can include at least one of the data learning unit (110) and data recognition unit (120). At least one of the data learning unit (110) and data recognition unit (120) can be embodied by the processor (210) and memory (220).

Figure 3:
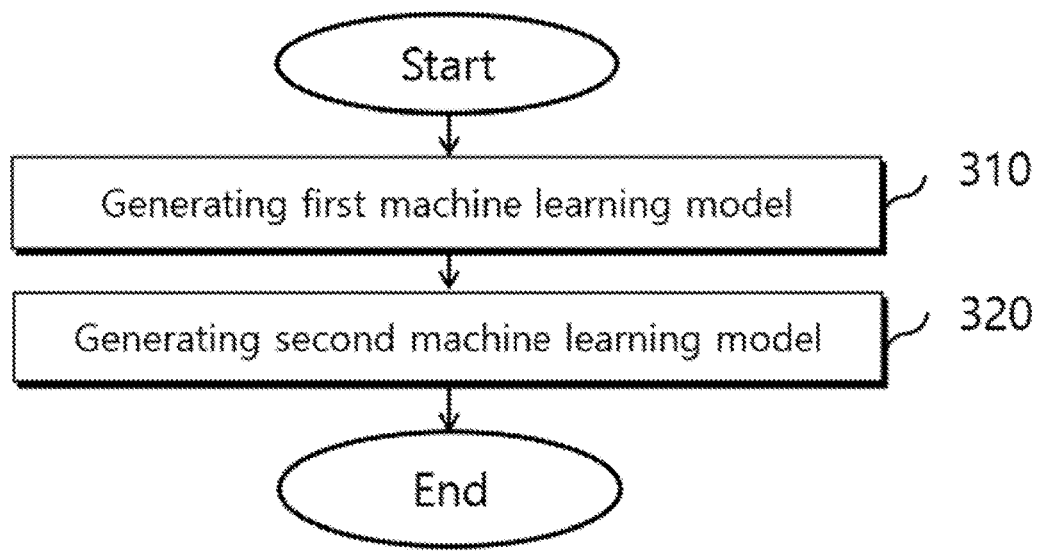
FIG. 3 is a flow diagram that illustrates operation of a machine learning apparatus according to an embodiment of this disclosure.

FIG. 3 is a flow diagram that illustrates operation of a machine learning apparatus according to an embodiment of this disclosure.

The processor (210) can execute a step (310) generating first machine learning model. In addition, the processor (210) can execute a step (320) generating second machine learning model. In the same way as the second machine learning model, the processor (210) can continually update the machine learning model by generating n-th machine learning model. The step (310) generating the first machine learning model and the step (320) generating the second machine learning model are explained in greater detail with FIG. 4.

Figure 4:
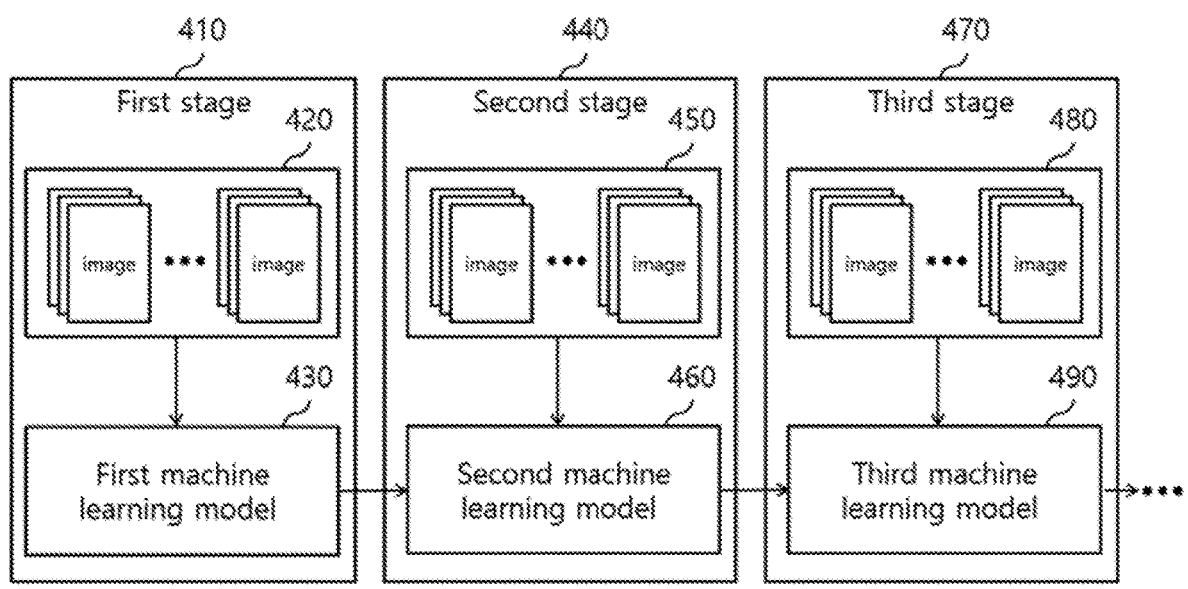
FIG. 4 is a figure that illustrates a machine learning process of a machine learning apparatus according to an embodiment of this disclosure.

FIG. 4 is a figure that illustrates machine learning process of a machine learning apparatus according to an embodiment of this disclosure.

The step (310) generating the first machine learning model can be executed in first stage (410). In the first stage (410), the processor (210) performs machine learning by receiving first data set (420). The first data set can be the target of the machine learning model. The first data set can include multiple data. Data can include one of image, sound and sensor output value. Data can be expressed as number or text. Explanation hereafter is based on premise that the first data set (420) includes at least one image data.

The processor (210) of the machine learning apparatus (200) can receive ground truth label information for each image data included in the first data set (420). Label information for the first data set (420) can include at least one of object included in image data or attribute information of image data. Here, the object represents an object expressed by multiple pixels in image data. Object information can include at least one of object name, object size, and object position in the image. Attribute information of image data can include at least one of device that acquired image data, acquisition date, acquisition place, and information about persons related to image data.

The processor (210) can perform machine learning on relationship between the first data set (420) and label information about the first data set (420).

In the first stage (410), the processor (210) can acquire first machine learning model (430) by performing machine learning based on the first data set (420). The first machine learning model (430) can be a machine learning model to perform the target task. The target task can be related to solving of a regression problem or classification problem.

The step (320) generating the second machine learning model can be executed in second stage (440). The second stage (440) can take place in a place different from the first stage (410). Otherwise, the second stage (440) can take place in the same place as the first stage (410) but at a different time. In the second stage (440), the processor (210) performs machine learning by receiving the second data set (450).

At least one of image data included in the second data set (450) can be different from image data included in the first data set (420). The processor (210) of the machine learning apparatus (200) can receive ground truth label information for each image data included in the second data set (450). The processor (210) can receive the first machine learning model (430) learned in the first stage (410).

The processor (210) can perform machine learning based on the first machine learning model (430), second data set (450), and label information for the second data set (450). In the second stage (440), the processor (210) can acquire the second machine learning model (460). Since the second machine learning model (460) is based on the first machine learning model (430), it can reflect both the first data set (420) and second data set (450).

Third stage (470) can take place in a place different from the first stage (410) and second stage (440). Otherwise, the third stage (470) can take place in the same place as the first stage (410) or second stage (420) but at a different time. In the third stage (470), the processor (210) performs machine learning by receiving the third data set (480).

At least one of image data included in the third data set (480) can be different from image data included in the first data set (420) or second data set (450). The processor (210) of the machine learning apparatus (200) can receive ground truth label information for each image data included in the third data set (480). The processor (210) can receive the second machine learning model (460) learned in the second stage (440).

The processor (210) can perform machine learning based on the second machine learning model (460), third data set (480), and label information for the third data set (480). In the third stage (470), the processor (210) can acquire third machine learning model (490). Since the third machine learning model (490) is based on the second machine learning model (460), it can reflect the first data set (420), second data set (450), and third data set (480). FIG. 4 explained the first stage (410) through third stage (470), but it is not limited to them. The processor (210) can generate n-th machine learning model based on (n−1)th machine learning model, n-th data set, and label information for n-th data set.

As described above, each stage can be executed in a different place or at a different time. Therefore, continual learning according to this disclosure is not only applicable to continual learning in different places but also to continual learning at different times. However, explanation on this disclosure will be focused on continual learning in different places for ease of explaining.

The step (310) generating the first machine learning model is explained in detail below using FIG. 5 and FIG. 6. The step (310) generating the first machine learning model can correspond to the first stage.

Figure 5:
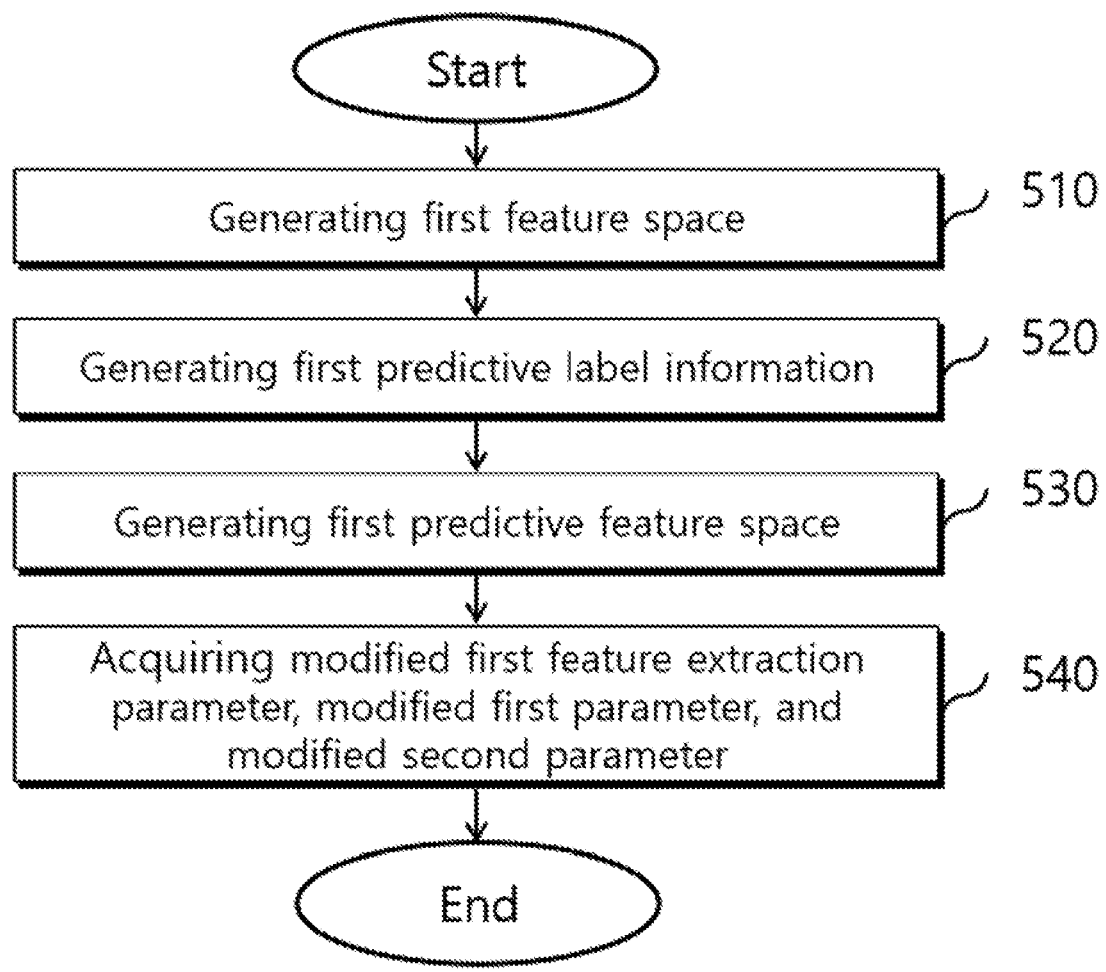
FIG. 5 is a flow diagram for generating a first machine learning model according to an embodiment of this disclosure.

FIG. 5 is a flow diagram for generating first machine learning model according to an embodiment of this disclosure. In addition, FIG. 6 is a figure for generating first machine learning model according to an embodiment of this disclosure.

Figure 6:
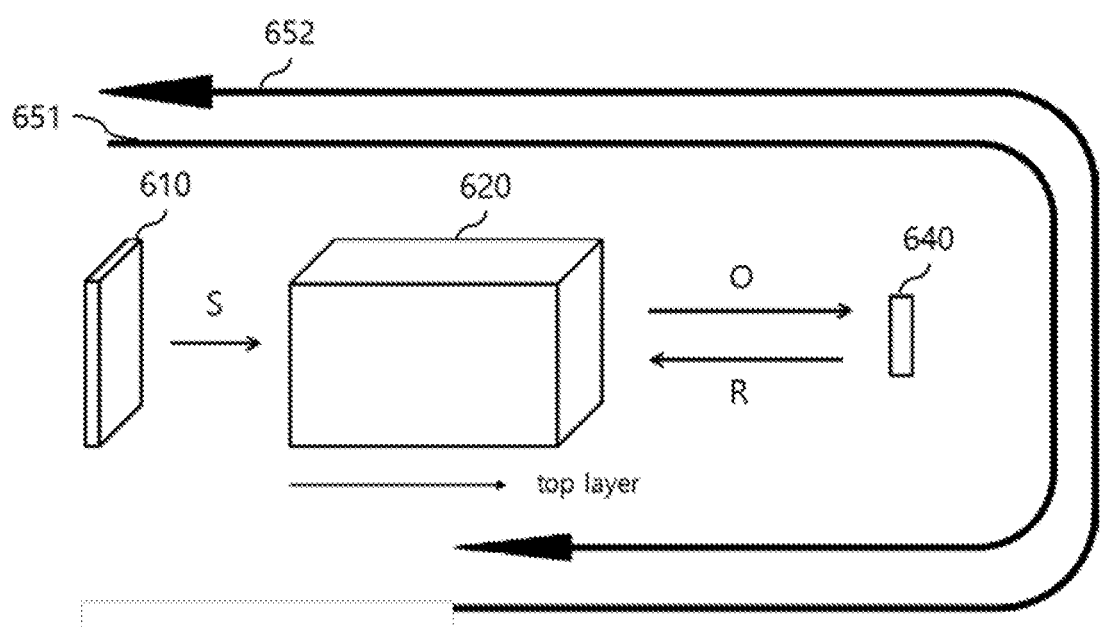
FIG. 6 is a figure for generating a first machine learning model according to an embodiment of this disclosure.

Referring to FIG. 6, the processor (210) can receive first data set (610). The first data set (610) can include at least one image data. The image data can have size of w×h. In addition, the image data can include 3 color channels. In other words, one image data can include w×h×3 pixels.

The processor (210) can execute a step (510) generating first feature space (620) is based on first data set (610) and first feature extraction parameter (S) related to neural network.

The processor (210) can use Convolution Neural Network CNN) to generate the first feature space. CNN is a type of Deep Neutral Network (DNN) composed of one or many convolutional layers, pooling layers, and fully connected layers. CNN has a structure appropriate for learning of 2-dimensional data and can be trained using the back propagation algorithm. CNN is one of representative models of DNN widely used in various application fields such as object classification in images, object detection, etc. CNN includes AlexNet, ZFNet, GoogleLeNet, VGGNet, and ResNet. The first feature space can be included in the hidden layer.

The first feature space (620) can be generated by applying at least one layer to image data included in the first data set (610). At least one layer can play the role of a filter that transforms input image data. The processor (210) can generate the first feature space (620) by applying the convolution layer, Rectifier Linear Unit (ReLU), or pooling layer to image data included in the first data set at least once.

The convolution layer includes machine learning parameters, and the first feature extraction parameter (S) can include parameters related to the convolution layer. The first feature extraction parameter (S) can be expressed as a matrix. Each element included in the first feature extraction parameter (S) can be updated in machine learning process.

If the processor (210) initially generates the first feature space (620) based on the first data set (610), the first feature extraction parameter (S) can be reset to a random value. The processor (210) can update the first feature extraction parameter (S) while performing machine learning based on multiple image data included in the first data set (610) and first label information.

Pooling may be max pooling or average pooling. Max pooling divides the previous layer into areas of prescribed size, decides the largest pixel value among pixels included in each area as the representative value of the prescribed area, and determines the next layer that is smaller in size than the previous layer. Average pooling divides the previous layer into areas of prescribed size, decides the average value of pixels included in each area as the representative value of the prescribed area, and determines the next layer that is smaller in size than the previous layer. Pooling has an effect of down-sampling the previous layer.

The processor (210) can execute a step (520) generating first predictive label information (640) by applying first parameter (O) to first feature space (620). The first parameter (O) can represent a machine learning parameter showing relationship between the first feature space (620) and first predictive label information (640). The first parameter (O) can show relationship between elements included in the first feature space (620) and multiple label information.

The first parameter (O) can be a parameter included in a fully connected layer. The fully connected layer shows multiple input neurons (nodes) and multiple output neurons (nodes) connected by prescribed weight. The fully connected layer can include a dropout layer to prevent overfitting of learning data.

The processor (210) can form a fully connected layer by using each element of the first feature space as multiple input neurons and multiple label information as multiple output neurons.

The processor (210) can calculate scores for multiple label information by applying the first parameter (O) to the first feature space (620). The processor (210) can decide the label information with highest score as the first predictive label information (640).

The first predictive label information (640) can be different from the first label information, which is ground truth information related to the first data set (610). The processor (210) can reduce difference between the first predictive label information (640) and first label information while updating the first parameter (O) using back propagation.

In specific, the processor (210) can generate multiple first predictive label information (640) for all image data included in the first data set (610). The processor (210) can update the first parameter (O) so as to minimize difference between multiple first predictive label information (640) and label information that correspond to multiple first predictive label information (640). Through this process, the processor (210) can perform machine learning on relationship between the first data set (610) and first label information.

The processor (210) can execute a step (530) generating first predictive feature space by applying second parameter (R) to first predictive label information (640). The processor (210) can reset the second parameter (R) to a random value when initially generating the first predictive feature space. The processor (210) can generate the first predictive feature space by applying the second parameter (R) to multiple first predictive label information (640). In other words, the first predictive feature space can be the first feature space (620) restored from the first predictive label information (640).

The processor (210) can reduce difference between multiple first predictive feature space and multiple first feature space (620) while updating the second parameter (R) using back propagation.

As explained above, the processor (210) generates the first feature space (620) from the first data set (610) through feed forward (651), generates the first predictive label information (640) from the first feature space (620), and derives the first predictive feature space from the first predictive label. The processor (210) can update parameters by using back propagation (652) after feed forward (651).

The processor (210) can execute a step (540) acquiring modified first feature extraction parameter, modified first parameter, and modified second parameter, which minimize at least one of difference between first label information and first predictive label information (640) and difference between first feature space (620) and first predictive feature space, using back propagation.

Back propagation refers to a process that updates parameters to minimize difference (error or cost). The difference can be calculated by cosine distance, L1 distance, L2 distance, or cross-entropy error.

The processor (210) can acquire modified second parameter (R') by updating second parameter (R) using back propagation (652). In addition, the processor (210) can acquire modified first parameter (O') by updating first parameter (O) using back propagation (652). In addition, the processor (210) can acquire modified first feature extraction parameter (S') by updating first feature extraction parameter (S) using back propagation (652).

To explain FIG. 5 more specifically, the processor (210) can select at least one data included in the first data set (610) as the first mini-batch data based on size of the prescribed mini-batch. Size of the mini-batch can have a natural number of 1 or higher. For instance, if size of the mini-batch is 64, the processor (210) can select 64 data included in the first data set (610).

The processor (210) can acquire first feature space, first predictive label information, and first predictive feature space by applying first feature extraction parameter, first parameter, and second parameter to first mini-batch data included in first data set (610). Such process is known as feed forward.

The processor (210) can update first feature extraction parameter, first parameter, and second parameter to minimize difference between first label information and first predictive label information (640) and difference between first feature space (620) and first predictive feature space using back propagation.

The processor (210) can acquire parameter update volume that corresponds to each data by performing feed forward and back propagation on all of multiple data included in the first mini-batch data. The processor (210) can update parameters based on average parameter update volume that corresponds to each data. This is called first iteration.

Next, the processor (210) can update first feature extraction parameter, first parameter, and second parameter again by performing feed forward and back propagation based on second mini-batch data included in first data set (610). In specific, the processor (210) can acquire parameter update volume that corresponds to each data by performing feed forward and back propagation on all of multiple data included in second mini-batch data. The processor (210) can update parameters based on average parameter update volume that corresponds to each data. This is called second iteration.

This process is carried out on all mini-batch data included in the first data set (610), and the processor (210) can ultimately acquire modified first feature extraction parameter (S'), modified first parameter (O'), and modified second parameter (R').

If first data set (610) includes K mini-batch data, the processor (210) can perform machine learning until K-th iteration. As such, performing machine learning on all mini-batch data included in first data set (610) once is called 1 epoch. The processor (210) can perform machine learning for L epoch. L is a natural number.

The processor (210) can verify performance of machine learning model for each epoch. The processor (210) can acquire multiple machine learning models for multiple epoch. The processor (210) can acquire the label information by applying each of multiple machine learning models to a separate validation dataset. The processor (210) can select the machine learning model with smallest error among multiple machine learning models as first machine learning model. The first machine learning model can include modified first feature extraction parameter (S'), modified first parameter (O'), and modified second parameter (R').

The modified first feature extraction parameter (S') and modified first parameter (O') can be included in the first machine learning model. In other words, the processor (210) can acquire the first machine learning model that accurately predicts the first label information from the first data set (610) by performing machine learning on while minimizing difference between the first label information and first predictive label information (640). The processor (210) can accurately predict the label information that corresponds to image data by applying the first machine learning model to image data.

As described above, the processor (210) can acquire modified second parameter (R'), modified first feature extraction parameter (S'), and modified first parameter (O') to minimize the difference between the first feature space (620) and first predictive feature space. The processor (210) can minimize catastrophic forgetting based on the modified second parameter (R'), modified first feature extraction parameter (S'), and modified first parameter (O').

The first machine learning model can include modified first feature extraction parameter, modified first parameter, and modified second parameter. The first machine learning model is the result of learning multiple image data included in the first data set (610). Therefore, the processor (210) can predict accurate label information by applying the first machine learning model. To improve performance of the first machine learning model, the processor (210) can perform additional machine learning using the first data set (610) and independent second data set. The processor (210) can generate the second machine learning model by improving the first machine learning model based on the second data set.

The first machine learning model can be used as the initial machine learning model for the second machine learning model. The step (320) generating the second machine learning model is explained in detail below using FIG. 7 and FIG. 8. The step (320) generating the second machine learning model can correspond to second stage.

Figure 7:
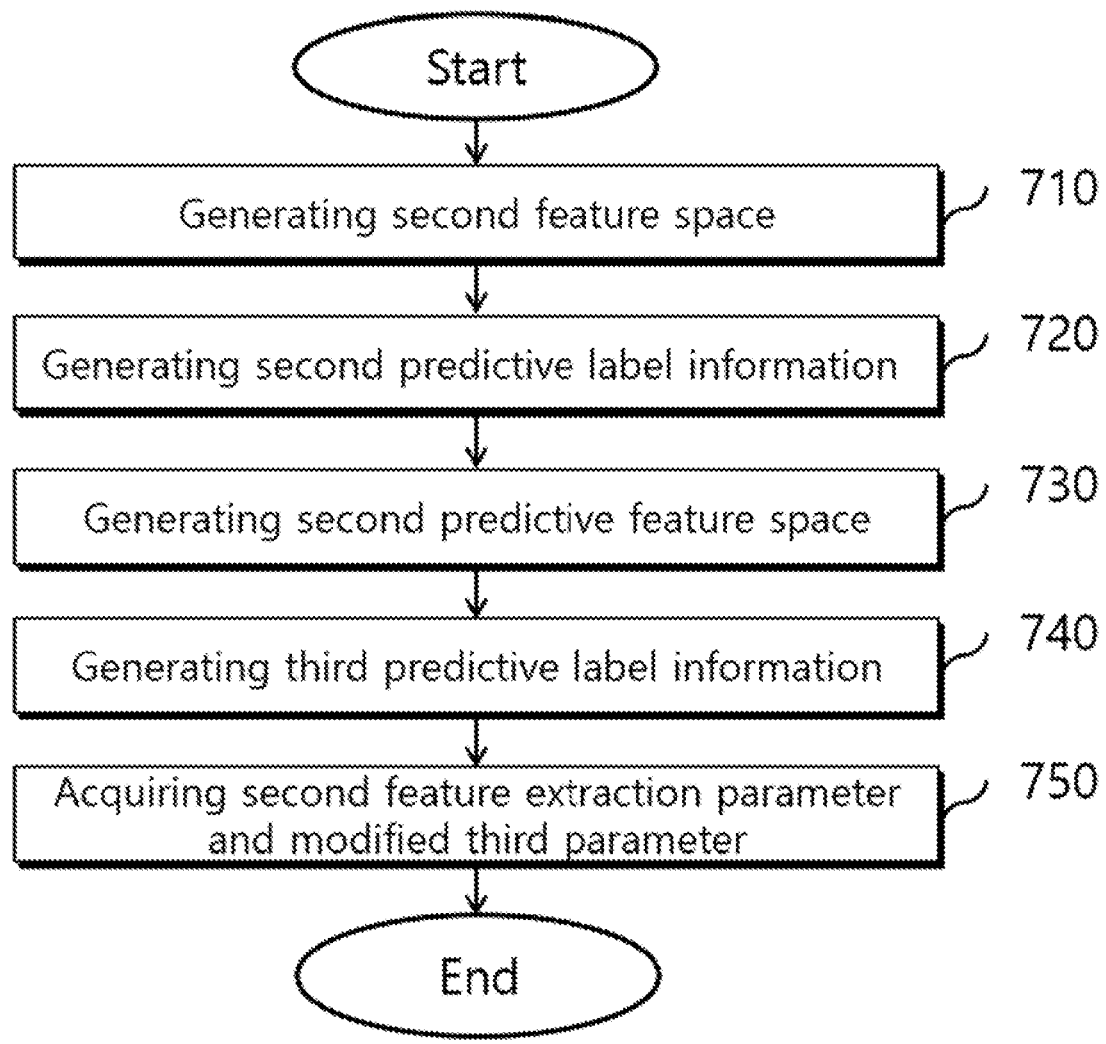
FIG. 7 is a flow diagram for generating a second machine learning model according to an embodiment of this disclosure.

FIG. 7 is a flow diagram for generating second machine learning model according to an embodiment of this disclosure. In addition, FIG. 8 is a figure for generating second machine learning model according to an embodiment of this disclosure.

Figure 8:
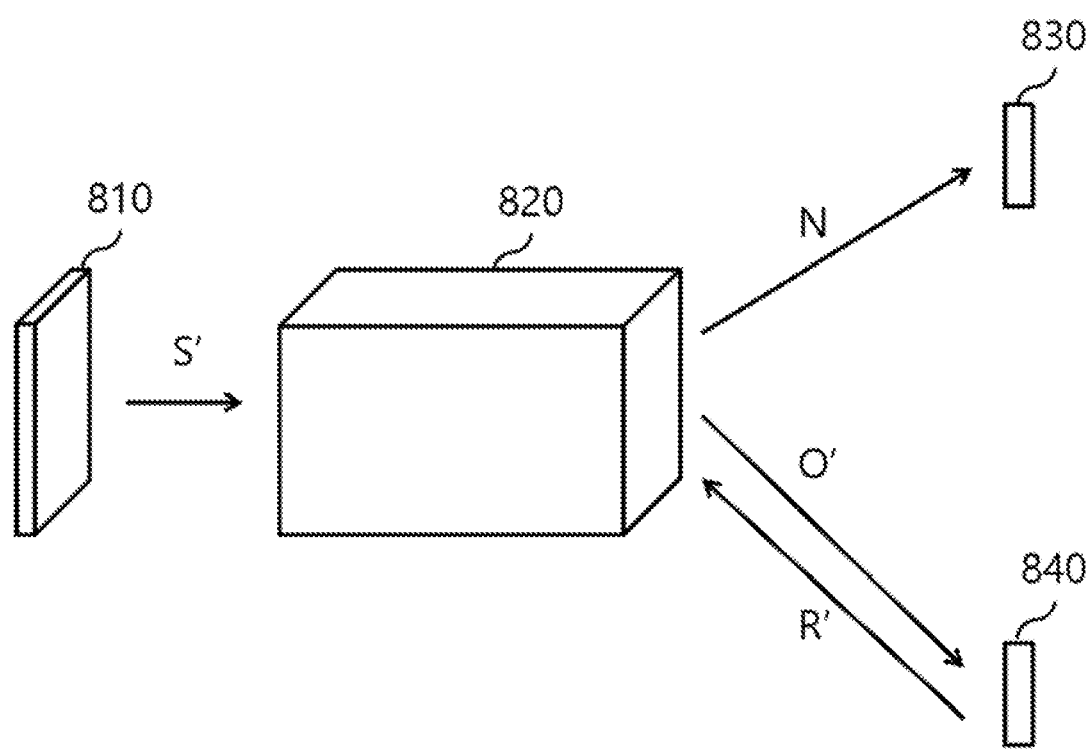
FIG. 8 is a figure for generating a second machine learning model according to an embodiment of this disclosure.

Referring to FIG. 8, the processor (210) can receive second data set (810). The second data set (810) can include at least one image data.

The first data set (610) and second data set (810) are independent of one another. In other words, size of the first data set (610) may be larger, smaller or same as size of the second data set (810). At least one of acquisition place, acquisition method, acquisition time or acquisition equipment of the first data set (610) and second data set (810) may be same or different. The first data set (610) and second data set (810) can be data sets to perform the same target task.

The second data set (810) can include multiple data. The processor (210) can perform machine learning based on multiple data included in the second data set (810).

The processor (210) can execute a step (710) generating second feature space (820) using based on the second data set (810) and modified first feature extraction parameter (S'). The second feature space (820) applies at least one layer to image data included in the second data set (810). For instance, the processor (210) can generate the second feature space (820) by applying the convolution layer, Rectified Linear Unit (ReLU), or pooling layer to image data included in the second data set (810) at least once. The second feature space can be included in the hidden layer.

The convolution layer includes machine learning parameters, and the modified first feature extraction parameter (S') can include parameters related to the convolution layer. The modified first feature extraction parameter (S') can be expressed as a matrix. Each element included in the modified first feature extraction parameter (S') can be updated while executing the step in which the second machine learning model is generated.

The processor (210) can use the modified first feature extraction parameter (S') acquired in the step (310) generating the first machine learning model as the initial value. The processor (210) can update the first feature extraction parameter (S') modified while executing the process in which the second machine learning model is generated based on the second data set (810) and second label information.

The processor (210) can execute a step (720) generating second predictive label information (840) by applying the modified first parameter (O') to second feature space (820). The second predictive label information (840) can be regarded as old branch output because it is generated using the first parameter (O') acquired in the first stage instead of using the third parameter (N) to be newly updated in the second stage.

In addition, the processor (210) can execute a step (730) generating second predictive feature space by applying modified second parameter (R') to second predictive label information. The second predictive feature space can be the second feature space restored based on the second predictive label information (840).

The processor (210) can execute a step (740) generating third predictive label information (830) by applying third parameter (N) to the second feature space (820). The third parameter (N) can be reset to the modified first parameter (O') included in the first machine learning model. Since the modified first parameter (O') is the result of learning based on the first data set (610), the processor (210) can quickly optimize the second machine learning model by using the modified first parameter (O') as initial value of the third parameter (N). The third parameter (N) can be updated while executing the step in which the second machine learning model is generated.

The third parameter (N) can represent machine learning parameters showing relationship between the second feature space (820) and third predictive label information (830). The third parameter (N) can show relationship between elements included in the second feature space (820) and multiple label information. The processor (210) can calculate scores for multiple label information by applying the third parameter (N) to second feature space (820). The processor (21.0) can decide the label information with highest score as the third predictive label information (830).

The third predictive label information (830) can be different from the second label information, which is ground truth information related to the second data set (810). The processor (210) can update the third parameter (N) using back propagation.

The processor (210) can execute a step (750) generating second feature extraction parameter by modifying the modified first feature extraction parameter (S') and generating modified third parameter by modifying the third parameter (N) so that at least one of difference (Lr) between the second feature space (820) and second predictive feature space, difference (Lo) between third label information and second predictive label information (840), and difference (Ln) between the second label information and third predictive label information is minimized using back propagation.

Figure 9:
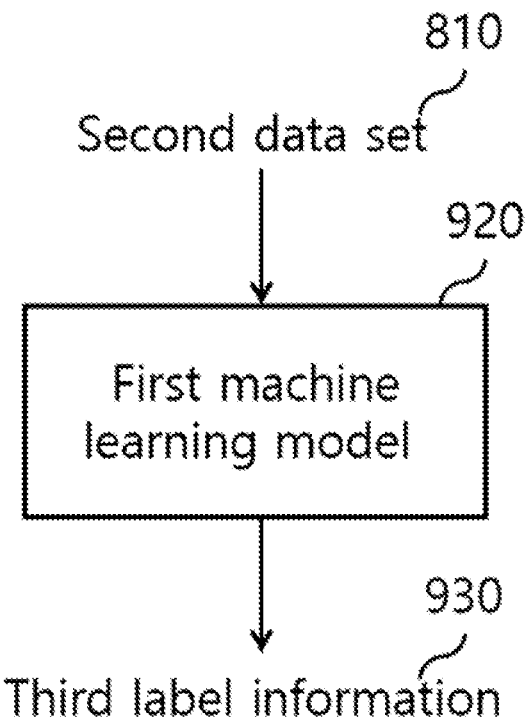
FIG. 9 is a figure that explains third label information according to an embodiment of this disclosure.

FIG. 9 is a figure that explains third label information according to an embodiment of this disclosure.

The third label information (930) can be acquired by applying the first machine learning model (920) to second data set (810). In other words, the processor (210) can acquire the third label information (930) based on of the second data set (810) and feed forward of the first machine learning model (920). More specifically, the processor (210) can acquire the third label information (930) by applying the modified first feature extraction parameter(S) acquired based on the first machine learning model (920) and the modified first parameter (O') to the second data set (810).

The third label information can be different from the second predictive label information (840) or third predictive label information (830). The third label information may not be changed as it is acquired based on the second data set (810) that remains unchanged in the second stage and the first machine learning model acquired already. However, the second predictive label information (840) can also change because the second feature space (820) changes in the machine learning process of the second stage. In addition, the third prediction label information (830) can also be changed because the second feature space (820) and third parameter (N) will be changed in the machine learning process of the second stage.

Referring to FIG. 7 and FIG. 8 again, the differences can be expressed as (Eq. 1), (Eq. 2), and (Eq. 3). The processor (210) can perform machine learning to minimize difference (L) based on (Eq. 1), (Eq. 2), and (Eq. 3).

$$L = L_n + L_{LwF} + L_{rec} \qquad \text{(Eq. 1)}$$

$$L_{LwF} = \lambda_{LwF} \times Lo \qquad \text{(Eq. 2)}$$

$$L_{rec} = \lambda_{rec} \times Lr \qquad \text{(Eq. 3)}$$

Here, Ln shows difference between the second label information and third predictive label information (830). Lo shows difference between the third label information and second predictive label information. In addition, Lr shows the between the second feature space (820) and second predictive feature space. $\lambda_{LwF}$ and $\lambda_{rec}$ are proportional constants. The processor (210) can set importance of Lo or Lr differently among Ln, Lo and Lr based on $\lambda_{LwF}$ and $\lambda_{rec}$. For instance, machine learning can be performed with Lo as high importance if $\lambda_{LwF}$ is set to be large. In addition, machine learning can be performed with Lr as high importance if $\lambda_{rec}$ is set to be large. The differences above can be calculated based on at least one of L1 distance, L2 distance, and cosine similarity.

Since the processor (210) performs machine learning to reduce overall length (L), at least one of $L_n$, $L_{LwF}$ or $L_{rec}$ can be increased in machine learning process. For instance, $L_n$ and $L_{rec}$ can be reduced while $L_{LwF}$ increases in machine learning process. Here, absolute value of amount of $L_n$ and $L_{rec}$ reduced may be greater than absolute value of amount of $L_{LwF}$ increased. The processor (210) can continually update the second feature extraction parameter by repeating the process of FIG. 7, and the modified third parameter can be continually updated. The second feature extraction parameter and modified third parameter can be included in the second machine learning model.

The processor (210) may not change the modified first parameter (O') of first stage and modified second parameter (R') in the second stage. In addition, the processor (210) can compare the third label information (930) with the second predictive label information (840) without changing it. The processor (210) can maintain the second feature space (820)

similarly to the first feature space (620) based on the third label information (930), modified first parameter (O'), and modified second parameter (R'). In addition, according to this disclosure, catastrophic forgetting can be reduced substantially by maintaining the second feature space (820) similarly to the first feature space (620).

To explain FIG. 8 more specifically, the processor (210) can select at least one data included in the second data set (810) as the third mini-batch data based on size of the prescribed mini-batch. Size of the mini-batch can have a natural number of 1 or higher. For instance, if size of the mini-match is 64, the processor (210) can select 64 data included in the second data set (810).

The processor (210) can acquire the second feature space (820), third predictive label information (830), second predictive label information (840), and second predictive feature space by applying the modified first feature extraction parameter (S'), third parameter (N), modified first parameter (O'), and modified second predictive label information (R') to the third mini-batch data included in the second data set (810). Such process is known as feed forward.

The processor (210) can update the third parameter (N) and modified first feature extraction parameter (S') to minimize at least one of difference between the second feature space (820) and second predictive feature space, difference between the third label information (930) and second predictive label information (840), and difference between the second label information and third predictive label information (830) using back propagation.

The processor (210) can acquire parameter update volume that corresponds to each data by performing feed forward and back propagation on all of multiple data included in the third mini-batch data. The processor (210) can update parameter based on average parameter update volume that corresponds to each data. This is called the first iteration of the second stage.

Next, the processor (210) can select fourth mini-batch data included in the second data set (810). The fourth mini-batch data can be different from the third mini-batch data. However, it is not limited to this condition, and at least one of data included in the fourth mini-batch data can overlap with the third mini-batch data.

The processor (210) can update the third parameter (N) and modified first feature extraction parameter (S') again by performing feed forward and back propagation on the fourth mini-batch data included in the second data set (810).

In specific, the processor (210) can acquire parameter update volume that corresponds to each data by performing feed forward and back propagation on all of multiple data included in the fourth mini-batch data. The processor can update parameter based on average update parameter volume that corresponds to each data. This is called second iteration of the second stage.

The processor (210) can execute this process on all mini-batch data included in the second data set (810). The processor (210) can acquire the final modified third parameter and second feature extraction parameter. The modified third parameter and second feature extraction parameter can be included in the second machine learning model.

If K mini-batch data are included in the second data set (810), the processor (21) can perform machine learning until K-th iteration. As such, performing machine learning on all mini-batch data included in the second data set (810) once is called 1 epoch. The processor (210) can perform machine learning for L epoch. L is a natural number.

The processor (210) can verify performance of the machine learning model for each epoch. The processor (210) can acquire multiple machine learning models for multiple epoch. The processor (210) can acquire the label information by applying each of multiple machine learning models to a separate validation dataset. The processor (210) can select the machine learning model with the smallest error among multiple machine learning models as the second machine learning model. The second machine learning model can include the modified first feature extraction parameter (S'), modified first parameter (O'), and modified second parameter (R').

In the machine learning process, elements of the second feature space (820) based on the modified first feature extraction parameter (S') can also be changed because the modified first feature extraction parameter (S') is updated. In other words, catastrophic forgetting can occur. However, the processor (210) can generate the second predictive feature space and perform machine learning to minimize the difference between the second predictive feature space and second feature space (820). Therefore, changes in the second feature space (820) will be minimized, and the machine learning model based on the first data set (610) of the first stage can be maintained. In other words, catastrophic forgetting can be reduced substantially.

The processor (210) can perform machine learning on n-th stage using same method as the method explained in FIG. 7 through FIG. 9. The processor (210) can acquire n-th machine-learning model by performing machine learning on n-th stage and updating (n−1)th machine learning model. In specific, the processor (210) can perform machine learning on the n-th stage based on (n−1)th machine learning model and n-th data set. The n-th data set can be independent from the first data set and second data set. The processor (210) can continually perform machine learning using the n-th data set with the modified first parameter (O') and modified second parameter (R') remaining unchanged.

Figure 10:
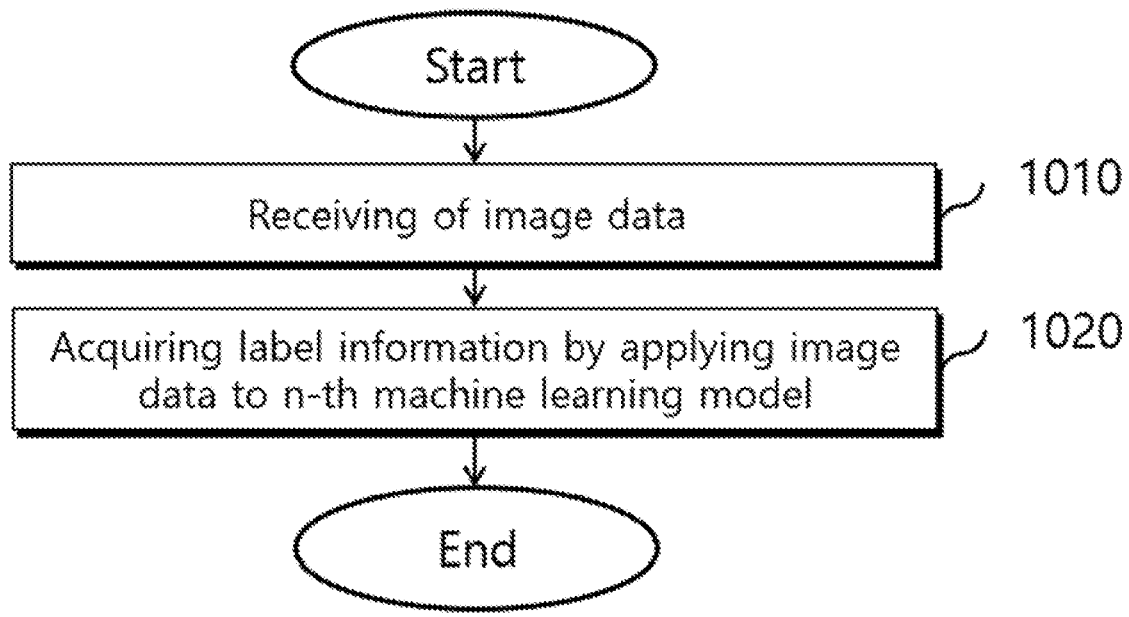
FIG. 10 is a flow diagram that illustrates testing of an embodiment of this disclosure.

FIG. 10 is a flow diagram that illustrates testing of an embodiment of this disclosure.

The processor (210) can predict the label information using the n-th machine learning model. The processor (210) can execute a step (1010) receiving image data. The processor (210) can execute a step (1020) acquiring label information that corresponds to image data by applying the n-th machine learning model to image data received. For instance, if the processor (210) uses the second machine learning model of the second stage, the processor (210) can acquire the label information that corresponds to the image data received by applying the second feature extraction parameter and modified third parameter to the image data received.

The processor (210) can save the fourth label on the memory. The fourth label information is the result of performing the target task on image data. The processor (210) evaluates accuracy of the fourth label information and can perform additional machine learning if the evaluation result does not exceed the reference value.

Figure 11:
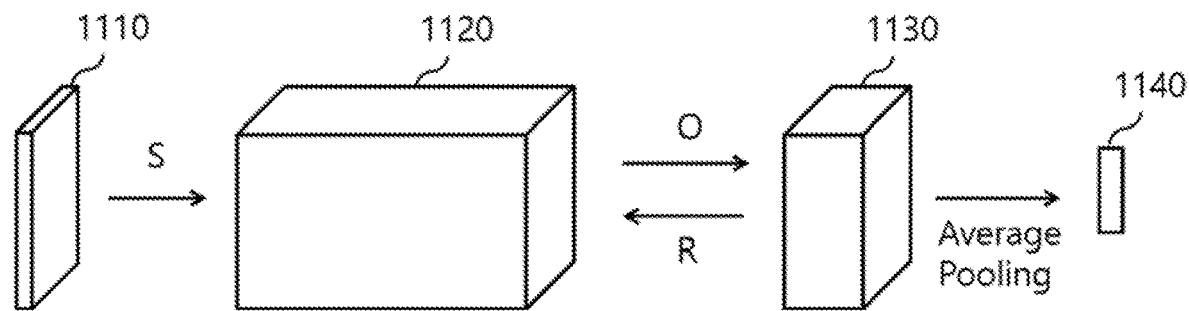
FIG. 11 is a figure of a machine learning method embodied using ResNet according to an embodiment of this disclosure.
Figure 12:
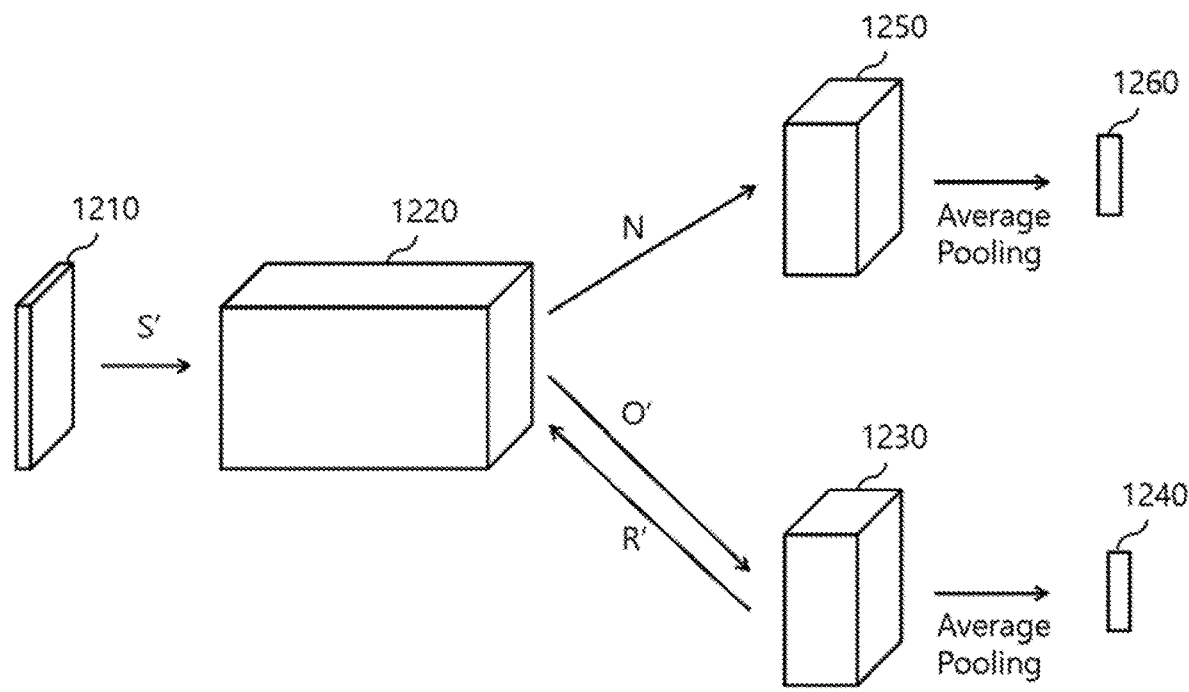
FIG. 12 is a figure of a machine learning method embodied using ResNet according to an embodiment of this disclosure.

FIG. 11 and FIG. 12 are figures of a machine learning method embodied using ResNet according to an embodiment of this disclosure.

FIG. 11 is a figure that changed structure of the machine learning method in FIG. 6 according to ResNet.

Referring to FIG. 6, the processor (210) can generate first feature space (620) by applying first feature extraction parameter (S) to first data set (610). In addition, the processor (210) can generate first predictive label information by applying first parameter (O) to the first feature space (620). In FIG. 6, top layer of the first feature space (620) can be an average pooling layer. In addition, the first parameter (O) can include a fully connected layer.

The top layer of ResNet can be composed of combination of an average pooling layer and fully connected layer. Here, the fully connected layer and average pooling layer are mutually commutative. Therefore, FIG. 11 is obtained by exchanging the fully connected layer and average pooling layer in FIG. 6.

Referring to FIG. 11, the processor (210) can generate the first feature space (1120) by applying first feature extraction parameter (S) to first data set (1110). In addition, the processor (210) can generate first predictive label space (1130) by applying first parameter (O) to first feature space (1120). The processor (210) can generate first predictive label information (1140) by applying the average pooling layer to the first predictive label space (1130).

If the average pooling layer is applied after the fully connected layer as shown in FIG. 11, there is an effect of modeling second parameter (R) more accurately.

FIG. 12 is a figure that changed the structure of the machine learning method in FIG. 8 according to ResNet.

Referring to FIG. 12, the processor (210) can generate second feature space (1220) by applying first feature extraction parameter (S') to second data set (1210). In addition, the processor (210) can generate second predictive label space (1230) by applying modified first parameter (O') to second feature space (1220). The processor (210) can generate first predictive label information (1240) by applying average pooling layer to the second predictive label space (1230). The processor (210) can restore the second predictive feature space by applying modified second parameter (R') to the second predictive label space (1230). The processor (210) can generate third predictive label space (1250) by applying third parameter (N) to the second feature space (1220). The processor (210) can generate third predictive label information (1260) by applying average pooling layer to the third predictive label space (1250).

If the average pooling layer is applied after the fully connecting layer as shown in FIG. 12, there is an effect of modeling modified second parameter (R') more accurately.

FIG. 13 is a table that presents performance of a machine learning method according to an embodiment of this disclosure.

To measure performance of the machine learning method according to an embodiment of this disclosure, the CIFAR-10 and CIFAR-100 data sets can be applied to the machine learning model according to an embodiment of this disclosure. The performance measurement results are as presented in the "Proposed" row.

In the table, "FT" refers to Fine-Tuning method. "EWC" refers to Elastic Weight Consolidation method, "LwF" refers to Learning without Forgetting method, "LwF+" refers to single-task, multi-center learning version of "LwF" which is a multi-task, multi-center learning method. EWCLwF combines EWC and LwF methods, and EWCLwF+ combines EWC and LwF+ methods.

Referring to FIG. 13, error of EWCLwF is smallest in first stage where machine learning was performed based on first data set. However, starting with second stage where machine learning was performed based on second data set, error of the method according to an embodiment of this disclosure is smallest. In other words, the machine learning method according to an embodiment of this disclosure can reduce catastrophic forgetting while achieving highest performance through sequential machine learning of independent data sets.

Various embodiments were examined so far. A person with common knowledge in the technical field of this invention would understand that this invention can be embodied into various other forms without deviating from essential characteristics of this invention. Therefore, the embodiments disclosed must be considered from an explanatory perspective instead of a limited perspective. The scope of this invention is shown in the scope of claims instead of earlier explanation, and all differences within this scope should be interpreted as to be included in this invention.

On the one hand, certain embodiments of this invention described above can be written as programs that can be executed on a PC, and they can be embodied on a general-purpose digital PC that operates the programs using computer readable recording media. The computer readable recording media include storage media such as magnetic storage media (for instance, ROM, floppy disk, hard disk, etc.) and optical reading media (for instance, CD-ROM, DVD, etc.).

What is claimed is:

1. A continual machine learning method comprising:
performing first machine learning on a first data set at a first stage by:
generating a first feature space by applying a first feature extraction parameter (S) to the first data set,
generating first predictive label information by applying a first parameter (O) to the first feature space,
generating a first predictive feature space by applying a second parameter (R), different from the first parameter (O), to the first predictive label information, and
generating a first machine learning model by performing machine learning on a relationship between the first data set and first label information and on a relationship between the first predictive label information and the first feature space, wherein the first machine learning model comprises a modified first feature extraction parameter (S'), a modified second parameter (R'), and a modified first parameter (O'), generated to minimize at least one of a difference between the first label information and the first predictive label information, or a difference between the first feature space and the first predictive feature space; and
providing the first machine learning model for a second stage different in place or time from the first stage such that second machine learning is performed on a second data set using the first machine learning model at the second stage to generate a second machine learning model different from the first machine learning model.

2. The method of claim 1, wherein performing the second machine learning comprises:
generating a second feature space based on the second data set;
generating second predictive label information from the second feature space;
generating a second predictive feature space based on the second predictive label information; and
generating the second machine learning model by performing machine learning on a relationship between the second data set and second label information and on a relationship between the second predictive label information and the second feature space.

3. The method of claim 2, wherein generating the first feature space comprises:
generating the first feature space based on the first data set and the first feature extraction parameter related to a neural network,
wherein generating the first predictive label information comprises,
generating the first predictive label information by applying the first parameter to the first feature space, and
wherein generating the first predictive feature space comprises,
generating the first predictive feature space by applying the second parameter to the first predictive label information.

4. The method of claim 2, wherein generating the second feature space comprises:
generating the second feature space based on the second data set and the modified first feature extraction parameter,
wherein generating the second predictive label information comprises,
generating the second predictive label information by applying the modified first parameter to the second feature space, and
wherein generating the second predictive feature space comprises
generating the second predictive feature space by applying the modified second parameter to the second predictive label information.

5. The method of claim 4, wherein generating the second machine learning model comprises:
generating third predictive label information by applying a third parameter to the second feature space, and
acquiring a second feature extraction parameter by modifying the first feature extraction parameter and a modified third parameter by modifying the third parameter to minimize at least one of a difference between the second feature space and the second predictive feature space, a difference between third label information and the second predictive label information, and a difference between the second label information and the third predictive label information using back propagation.

6. The method of claim 5 further comprising acquiring the third label information by applying the first machine learning model to the second data set,
wherein the modified first parameter and modified second parameter are unchanged.

7. The method of claim 5, further comprising:
receiving image data;
acquiring a fourth label by applying image data to the second machine learning model that includes the second feature extraction parameter and the modified third parameter; and
storing the fourth label on the memory.

8. The method of claim 1, further comprising updating the first feature extraction parameter (S) while performing the first machine learning based on multiple data included in the first data set and the first label information.

9. The method of claim 1, further comprising:
generating multiple first predictive label information for all image data included in the first data set; and
updating the first parameter (O) so as to minimize a difference between the multiple first predictive label information and label information that correspond to the multiple first predictive label information.

10. The method of claim 1, wherein the first machine learning and the second machine learning are performed by a processor of the same computing device or processors of different computing devices.

11. A machine learning apparatus for performing continual learning using machine learning, the machine learning apparatus comprising at least one memory storing computer-executable instructions and at least one processor configured to execute the computer-executable instructions, wherein the at least one processor is configured to perform, by executing the computer-executable instructions:
performing first machine learning on a first data set at a first stage by:
generating a first feature space by applying a first feature extraction parameter (S) to the first data set,
generating first predictive label information by applying a first parameter (O) to the first feature space,
generating the first predictive feature space by applying a second parameter (R), different from the first parameter (O), to the first predictive label information, and
generating a first machine learning model by performing machine learning on a relationship between the first data set and first label information and on a relationship between the first predictive label information and the first feature space, wherein the first machine learning model comprises a modified first feature extraction parameter (S'), a modified second parameter (R'), and a modified first parameter (O'), generated to minimize at least one of a difference between the first label information and the first predictive label information, or a difference between the first feature space and the first predictive feature space; and
providing the first machine learning model for a second stage different in place or time from the first stage such that second machine learning is performed on a second data set using the first machine learning model at the second stage to generate a second machine learning model different from the first machine learning model.

12. The apparatus of claim 11, wherein the at least one processor is further configured to perform, by executing the computer-executable instructions:
generating a second feature space based on the second data set;
generating second predictive label information from the second feature space;
generating a second predictive feature space based on the second predictive label information; and
generating the second machine learning model by performing machine learning on a relationship between the second data set and second label information and on a relationship between the second predictive label information and the second feature space.

13. The apparatus of claim 12, wherein the at least one processor is further configured to perform, by executing the computer-executable instructions:
generating the first feature space based on the first data set and the first feature extraction parameter related to a neural network;
generating the first predictive label information by applying the first parameter to the first feature space; and
generating a first predictive feature space by applying the second parameter to the first predictive label information.

14. The apparatus of claim 12, wherein the at least one processor is further configured to perform, by executing the computer-executable instructions:

generating the second feature space based on the second data set and the modified first feature extraction parameter;

generating the second predictive label information by applying the modified first parameter to the second feature space;

generating the second predictive feature space by applying the modified second parameter to the second predictive label information; and generating third predictive label information by applying third parameter to the second feature space.

15. The apparatus of claim 14, wherein the at least one processor is further configured to perform, by executing the computer-executable instructions:

acquiring a second feature extraction parameter by modifying the modified first feature extraction parameter and acquiring a modified third parameter by modifying the third parameter, which minimize at least one of a difference between the second feature space and the second predictive feature space, a difference between a third label information and the second predictive label information, and a difference between the second label information and the third predictive label information, using back propagation.

16. The apparatus of claim 15, wherein the at least one processor is further configured to perform, by executing the computer-executable instructions:

acquiring the third label information above by applying the first machine learning model to the second data set, wherein the modified first parameter and the modified second parameter are unchanged.

17. The apparatus of claim 15, wherein the at least one processor is further configured to perform, by executing the computer-executable instructions:

receiving image data;

acquiring a fourth label by applying the image data to the second machine learning model that includes the second feature extraction parameter and the modified third parameter; and storing the fourth label on the memory.

* * * * *